United States Patent
Prutkin

(12)
(10) Patent No.: US 6,362,252 B1
(45) Date of Patent: Mar. 26, 2002

(54) HIGHLY FILLED POLYMER COMPOSITION WITH IMPROVED PROPERTIES

(76) Inventor: Vladimir Prutkin, 477 34$^{th}$ Ave., #12, San Francisco, CA (US) 94121

( * ) Notice: Subject to any disclaimer, the term of this patent is extended or adjusted under 35 U.S.C. 154(b) by 0 days.

(21) Appl. No.: 08/771,505

(22) Filed: Dec. 23, 1996

(51) Int. Cl.$^7$ ................................................. C08K 3/00
(52) U.S. Cl. ....................... 523/200; 523/205; 523/209; 523/216; 524/425; 524/440; 524/443
(58) Field of Search ................................. 523/200, 205, 523/209, 216; 524/425, 440, 443

(56) References Cited

U.S. PATENT DOCUMENTS 4,003,866 A * 1/1977 Paturle .................. 260/17.4 R

* cited by examiner

*Primary Examiner*—Edward J. Cain
(74) *Attorney, Agent, or Firm*—I. Zborovsky

(57) ABSTRACT

A highly filled polymer composition with improved properties comprising: a continuous matrix material; a filler material in an amount of 10 to 80 wt. % of said composition; a polymer plasticizer dispersed in said continuous matrix material in an amount of 0.5 to 15 wt. % of said filler; a filler coating material which coats said filler particles in the form of a continuous coating layer thus forming coated filler particles; a diffusion zone around said coated filler particles where said filler coating and said continuous matrix material are mutually diffused into one another wherein said filler coating material is distributed with concentration decreasing in the direction outward from said continuous coating layer. Provided also is a method of preparing the aforementioned composition which guarantees that during extrusion or similar treatment the filler particles are coated with a continuous layer of the filler coating material and that the aforementioned diffusion zone is formed around the coated filler particles. In the manufacture of various products such as pipes, sheets, profiles, etc., the composition of the invention combines high deformation capacity with sufficient strength. Furthermore, the composition of the invention possesses high anticorrosive properties, has low shrinkage, and has high adhesion to metals, wood, plastics, etc.

16 Claims, 2 Drawing Sheets

HIGHLY FILLED POLYMER COMPOSITION WITH IMPROVED PROPERTIES

TECHNICAL FIELD

The invention relates generally to extender-filled thermoplastic compositions. More particularly, the invention relates to a polymer composition, such as a thermoplast, that can be highly loaded with low cost fillers and that can be used for manufacturing articles of high flexibility, strength, and adhesive properties suitable for many critical applications.

DESCRIPTION OF THE PRIOR ART

In the last decades, the number of thermoplastic materials have increased not so much through development of new polymers, but rather through modification of existing ones. By blending two or more different polymers, and/or by adding modifiers and fillers it becomes possible to modify such properties of articles produced from the aforementioned polymer compositions as strength, resistance to UV, resistance to oxidation, shrinkage, electrical conductivity, adhesive properties, and cost. For example, some inexpensive extender filler can increase the strength of the polymeric products and decrease their cost. All too often, however, while the targeted properties improve, some other properties deteriorate beyond the level acceptable for the given application.

It is a widely known fact that high density polyethylene and polypropylene, the materials which are easy to extrude and mold, have high shrinkage, from 2.5 to 5%, and a large coefficient of linear thermal expansion. The coefficient of linear expansion for polypropylene between 0 and 100° C. is from $1\times10^{-4}/°$ C. to $2.5\times10^{-4}/°$ C., and for polypropylene at 20° C. is $1.1\times10^{-4}/°$ C. That makes these materials less applicable for products which require high dimensional accuracy. However, it is also known that filling of polymers usually reduces their shrinkage and the coefficient of thermal expansion.

The filler material may be in the form of particles, flakes, fibers, etc. In the context of the present invention, the word "particle" means any particulate element such as a sawdust particle, a finely cut fiber, a flake of mica, etc.

The importance of fillers in the plastic industry is to some degree reflected by the fact that production of fillers has been growing at a faster pace than that of plastics in general. Inexpensive extenders having substantially microsphere-like particles, such as calcium carbonate, reground post-industrial and post-consumer plastics (hereinafter referred to either as "used plastics" or "recycled plastics"), are commonly used as polymer fillers. Extrapolating from the statistics for 1967 to 1985 (provided by Kiln and Co.), the current total annual US use of extender fillers could be above 2,000,000 tons. Other sources have higher estimates.

U.S. Pat. No. 3,830,776 of August 1974, issued to Carlson and Banks, discloses a method for separating particulate fractions from fly ash for use as a filler for epoxy. The compositions formed by this method have high crush resistance and strength, but are relatively rigid.

U.S. Pat. No. 4,294,750, issued to Klingaman and Ehrenreich in October 1980, discloses a method for separating filler particles from coal-burning power plants' fly ash for use in a nylon-based composition. These pyroplastoid particles are ellipsoidal in shape and, by weight, at least 90% of them are less than 25 $\mu$m in size.

In 1986, Electric Power Research Institute (EPRI) in Palo Alto, Calif., published a study (EPRI CS4765, Project 2422-11), Evaluation of Plastic Filler Applications for Leached Fly Ash. The study looked into the commercial potentials of acid-leached fly ash from coal-burning power stations. Their conclusion was that the leached fly ash has a potential as a filler for polymeric compositions. They also concluded that the higher the ash content in a polypropylene or nylon composition, the more drastically the elasticity of the composition drops. That deficiency explains why such an inexpensive and widely available extender, such as fly ash is not widely used in the polymer industry. Instead, much of the fly ash, a plentiful byproduct of power generation, is currently disposed of in landfills at a considerable expense to coal-burning power stations.

U.S. Pat. No. 5,308,693 of May 1994, issued to Ryle et al, relates to Unstretched Synthetic Papers and Methods of Producing Same and discloses a non-stretched synthetic paper having 10 to 25 wt. % diatomaceous earth-filled and high density polyethylene-based compositions. Synthetic paper is increasingly being used in countries where wood is expensive. Since synthetic paper does not produce dust or tear easily, it has additional value for the high speed printing industry. Despite the advantages of synthetic paper, its cost is still too high to compete with wood-pulp paper in countries having abundant wood resources.

To improve the bond between a filler and the rest of the polymer composition, various so-called "coupling agents" are empirically selected, and fillers are treated with them either prior to being mixed into the composition, or during in-line compounding. For example, it is known that treatment of fine-grain fillers with silicone hydrates ($Si_nH_{2n+2}$) maximizes the hydrophobicity and optimizes the electrical properties of filled polymer compositions; it is known that preliminary treatment of a filler with the hydrates of Si or Ti will improve the impact strength, thermal resistance, water stability, and strain-stress properties of filled compositions.

Atactic polypropylene has been known to increase the levels of loading compositions with carbon black and flame retardants (see U.S. Pat. No. 4,425,262 of January 1984). Atactic polypropylene has also been used as a thermally-removable binding agent for ceramics (see U.S. Pat. No. 5,256,609 of October 1993, issued to Dolhert). This invention relates to the clean burning green ceramic tape cast system using atactic polypropylene binder. However, such compositions are not suitable for molding into rigid components that maintain some flexibility.

While the extender fillers increase the modulus of elasticity of a composition, they drastically reduce its elongation at rupture. For any product which incorporates flexing elements or which has to withstand even occasional surface impacts, such as containers, furniture, instrument housings, automotive oil pans, bumpers and body panels, this reduced elongation is detrimental. Thus, for all practical purposes these filled polymers cannot be effectively used for items requiring stretching or bending properties.

Table 1 shows the change of some properties for a selected group of polymer compositions loaded 30 to 40 wt. % (percentage in weight) with various substantially microspheric fillers.

TABLE 1

| Polymer & Filler | Amount of Filler wt. % | Modulus of Elasticity (bending) MPa | Tensile strength at yield MPa | Elongation at yield % |
|---|---|---|---|---|
| Polypropylene | 0 | 931 | 23 | 93% |
| Filled Polypropylene | | | | |
| Talc | 40 wt. % | 2,617 | 22 | 8% |
| $CaCO_3$ | 40 wt. % | 1,939 | 18 | 12% |
| Glass Microspheres | 40 wt. % | 1,497 | 14 | 43% |
| Cenospheres | 40 wt. % | 1,731 | 16 | 33% |
| Polyamide 6,6 | 0 | 2,335 | 72 | 58% |
| Filled Polyamide 6,6 | | | | |
| Talc | 40 wt. % | 5,265 | 73 | 1.6% |
| $CaCO_3$ | 40 wt. % | 4,411 | 75 | 1.9% |
| Glass Microspheres | 30 wt. % | 3,008 | 56 | 12% |
| Cenospheres | 40 wt. % | 4,227 | 65 | 1.9% |
| Polyvinylchloride | 0 | 2,525 | 51 | 32% |
| Filled Polyvinylchloride | | | | |
| Talc | 40 wt. % | 5,954 | 44 | 1.8% |
| $CaCO_3$ | 40 wt. % | 4,609 | 42 | 2.3% |
| Glass Microspheres | 40 wt. % | 3,853 | 29 | 30% |
| Cenospheres | 40 wt. % | 4,160 | 27 | 22% |
| High Density Polyethylene | 0 | * | * | * |
| Filled High Density Polyethylene | | | | |
| $CaCO_3$ (sold as PE-3CC-3 by Washington Penn) | 33 wt. % | 172 | 9 | — |
| $CaCO_3$ (sold as RTP-740 by RTP) | 40 wt. % | 1,379 | 17 | 11% |

*Data unknown to the author.

The data given in Table 1 are typical; highly extender-filled compositions have low relative elongation and do not have high tensile strength. The actual data related to filled polypropylene, polyamide 6,6, and polyvinylchloride are taken from *Plastics Compound*, 1986, v. 9, no. 7, pp. 12–18. The actual data about calcium carbonate-filled high density polyethylenes marketed by Washington Penn and RTP come from *Plastic Technology*, 1992/1993, pp. 700–701. Unfortunately, I can only guess about the properties of the high density polyethylenes used by Washington Penn and by RTP in making their calcium carbonate-filled polymers. That, however, doesn't change things in principle: compositions on the market which have high elongation and high tensile strength. Whereas high density polyethylene has usually over 500% elongation at yield and over 20 MPa of tensile strength, RTP-740 has only 11 % maximum elongation and 17 MPa of tensile strength, and PE-3CC-3 has even less elongation and only 9 MPa of tensile strength.

The author of the present patent application has studied the nature of border regions between the filler particles and the surrounding matrix materials. The study revealed that the aforementioned border zones have microcracks which can be detected under an electron microscope. FIG. 1 illustrates a filler particle 10 in continuous polymer matrix 12 of a filled polymer and schematically represents a slice of a fly ash-filled HDPE specimen obtained on an electron microscope; the actual size of filler particle 10 is about 12 μm in diameter. A dark "donut"-like zone 14 around fly ash particle 10 in FIG. 1 is the aforementioned zone of embryonic microcracks. These embryonic microcracks can be attributed to a combination of the inner stresses due to the shrinkage of polymer matrix material 12, and the stresses produced by the slicing of the specimen in preparation to its viewing in the microscope. It is obvious that such compositions which readily develop embryonic microcracks cannot be flexible or strong.

Attempts have been made to solve the above problems for filled high density polyethylene. For example, the composition disclosed in application Ser. No. 3,740,522 for USSR Inventor's Certificate, filed on May 17, 1984, by the author of the present patent application, solves a problem about the low elongation, but the flex modulus and the tensile strength still remain at a very low level. Thus, an average tensile strength at yield ensured by the compositions described in the aforementioned USSR Application for inventor's certificate does not exceed 21 MPa.

Among polymers, high density polyethylene (HDPE) is considered to be a good material for anticorrosive protection because of its relatively low cost, relatively low permeability to moisture and other oxidizing agents, and sufficient ability to elongate and to withstand occasional surface impacts. HDPE is also considered to be an effective erosion resistant polymer. However, the effectiveness of HDPE as an anticorrosive coating material for the outside of metal pipes, as well as an antierosion coating material, e.g., to protect the inner surfaces of metal gas pipes against erosion due to the effect of the solid particles transported in pipes with the flow of gas, are significantly reduced by its very low adhesion to metals. One of the reasons for that, but not the only one, is that HDPE has very high shrinkage. Therefore, when HDPE is used as a corrosive layer in a critical application, it is usually used as the upper layer in a sandwich of anticorrosive coatings. Here is a sample of such a three-layer sandwich: a 0.6 mm thick layer of epoxy to get a better adhesion with the metal; a 0.5 mm tie layer to facilitate a reasonable bond between the epoxy and the HDPE; and a 1 mm thick layer of HDPE to shield the other two layers of the sandwich from penetration of oxidizing substances, and from mechanical impacts.

In other words, the use of HDPE as an anticorrosive coating in critical applications requires the use of a complicated and expensive sandwich technology. For the same reason, the use of HDPE as an inexpensive antierosion coating material is also hampered. Besides, the thermal and chemical resistance of HDPE itself, its compatibility with other polymers, as well as its cost have enough room for further improvements.

OBJECTIVES OF THE INVENTION

It is an object of the present invention to provide a highly filled polymer composition which is inexpensive to manufacture and which combines high deformation capacity with sufficient tensile strength.

It is also an object of the present invention to provide highly filled polymer compositions which have significantly reduced shrinkage and coefficient of thermal expansion, improved chemical and UV resistance, and reduced permeability to oxygen and other corrosive substances.

Furthermore, it is also an object of the present invention to provide highly filled polymer compositions which have highly improved adhesion with other materials, such as metals, and can withstand occasional surface impacts, so that these compositions can be used as single-layer anticorrosive coatings in the manufacture of metal pipes and similar articles.

These and other objects and features of the invention will become more apparent after the consideration of the ensuing description of the invention.

SUMMARY OF THE INVENTION

Figure 1:
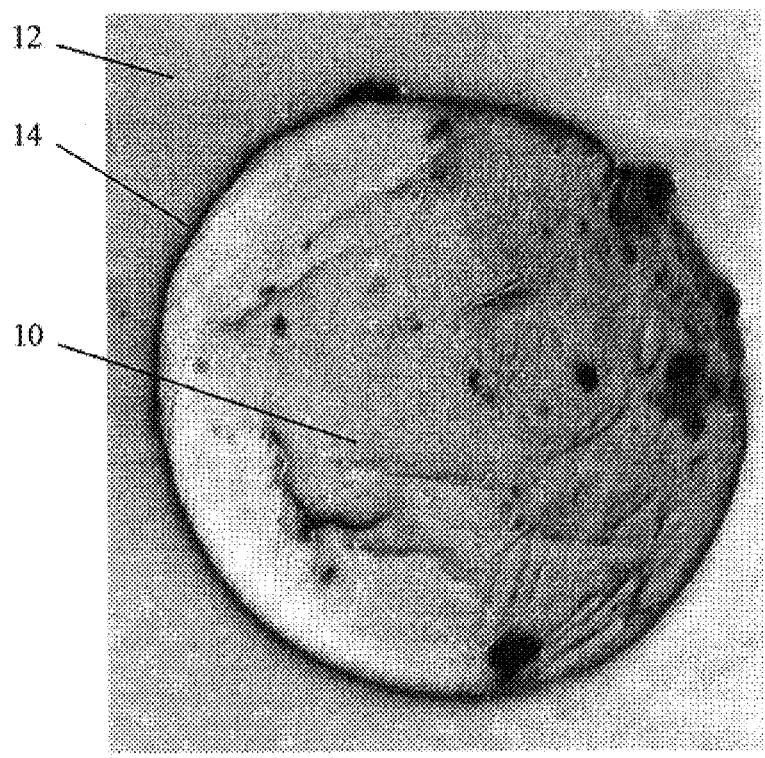
FIG. 1 shows a filler particle within the continuous matrix material of a HDPE-based composition of the known state of art technology as it is seen through an electron microscope.

This invention relates to polymer compositions which are highly filled with an extender filler (from 10 to 80% by weight) and are characterized by high tensile strength and retention of some base polymer's ability to elongate, both of which are required for many critical applications. Most of the compositions described in the examples are formed of HDPE filled with substantially microspheric filler, e.g., fly ash and calcium carbonate. The filler is previously treated with a linear low density polyethylene (hereinafter referred to as "LLDPE") and with a polymer plasticizer. The treating of a filler with LLPDE and a polymer plasticizer permits the composition of the invention to be filled with a filler up to 80% of the overall weight of the composition while still retaining some of the base polymer's flexibility.

Depending on the level of filling, the filler, and the polymer which is filled, the compositions of this invention can be used for extruding sheets and pipes, for making films, and for making low shrinkage, high-adhesion anticorrosion and antierosion coatings.

In preferred embodiments of the invention, up to 40 wt. % filled HDPE-based compositions may be extruded into pipes, including pressure pipes, sheets, construction elements or general purpose, collapsible shipping boxes. In an equally preferred embodiment of the invention, the higher-filled HDPE-based compositions (up to 80 wt. % filled) may be used as anticorrosive coatings for rebars, steel pipes, sea-going vessels, and the like, and as bonding and/or protective layers for plywood and other porous materials.

The compositions of the invention have an increased UV and thermal stability, a smaller coefficient of thermal expansion, and higher resistance to chemical substances and sea water than the prior art compositions.

DETAILED DESCRIPTION OF THE INVENTION

The composition of this invention consists of five functional components:
- a continuous thermoplast-type matrix material such as HDPE, PET, PP, and PVC;
- a filler material, such as fly ash, calcium carbonate, ceramic fibers, sawdust, and the like, having particles of a substantially microspherical configuration with an average diameter of particles within the range of 5 to 30 $\mu$m and in an amount of 10 to 80 wt. % of the aforementioned composition;
- a polymer plasticizer such as an atactic polypropylene dispersed in the aforementioned continuous matrix material in an amount of 0.5 to 15 wt. % of the aforementioned filler;
- a filler coating material such as LLDPE and polyurethane which coats aforementioned filler particles in the form of a continuous coating layer having a thickness not less than 1.0 to 1.5% of the particle diameter, whereby coated filler particles are formed; and
- a diffusion zone around aforementioned coated filler particles where the coating material and the continuous matrix material are mutually diffused into one another.

The filler may be a mixture of more than one particular filler; for instance, fly ash as the dominating filler can also contain a given amount of NEXTEL 480 fibers (a 3M product) to improve the composition's impact strength. The matrix material may also be a mixture of several materials; for instance, the continuous matrix of HDPE can also contain some amount of LDPE. The polymer plasticizer can also be a mixture of several substances; for instance, atactic polypropylene of certain properties can be working in a mixture with bitumen.

Filler Material

One of the most promising, widely available and inexpensive, and by far the most under-used filler is fly ash.

Fly ash is an ample byproduct of the energy generation process. When pulverized coal is blown into a high temperature furnace and burned, a byproduct of this process melts into hollow particles resembling microspheres. A large percentage of these particles are hollow because the melt settles around rising gas bubbles. These particles are drawn into the exhaust system and, before they can enter the atmosphere, are collected by various anti-pollution devices such as cyclones and baghouses. The chemical composition of fly ash depends on the coal which is burned, on the temperature, and on other aspects of the burning process.

For all practical purposes, fly ash is an inexhaustible source of low cost extender filler for plastic compositions. As it was said above, the entire US plastics industry needs about 2,000,000 tons of extender fillers of all kinds annually. In 1993, 60,000,000 tons of fly ash were produced in the US, only 21% of which went for any useful purpose, mostly as filler for concrete, and as a soil additive. In 1993, almost 40,000,000 tons of fly ash were deposited in landfills at a cost to the producers of $40 to $60/ton.

Figure 3:
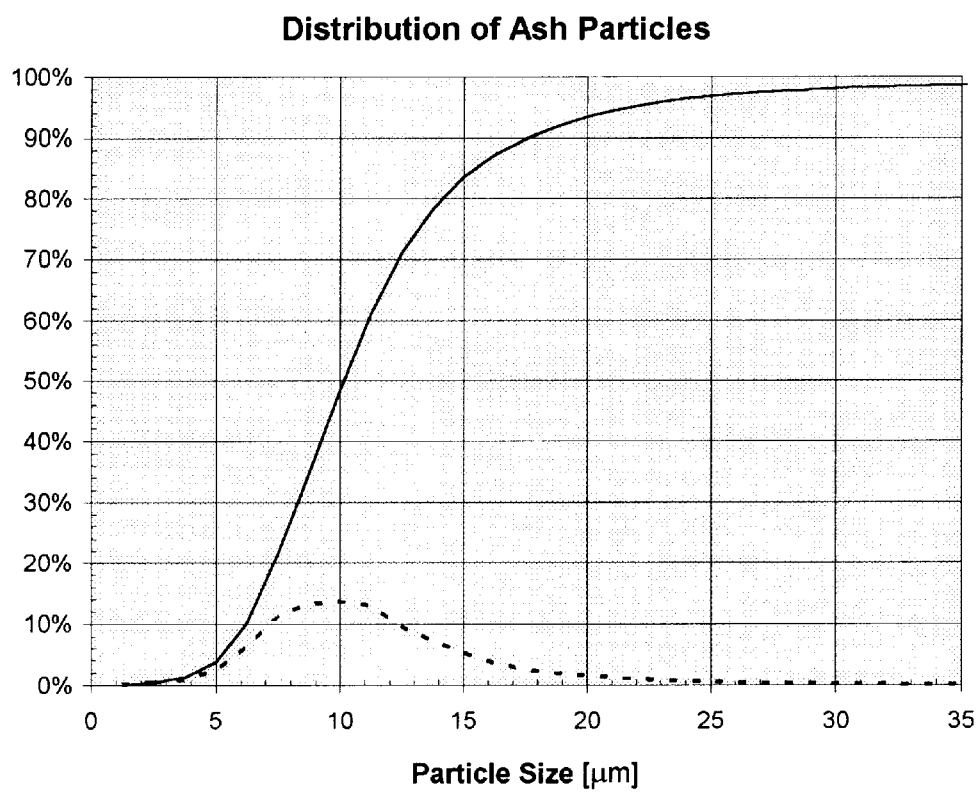
FIG. 3 is a graph showing the distribution of the fly ash particles used in all examples of the compositions of the invention, where a dash line represents distribution of the particles, and a continuous line represents the cumulative distribution.

The particle size distribution of the fly ash with which the author produced best results is shown in FIG. 3. The curve was obtained using a device based on Coulter counter measuring technique. The Coulter counter is an electronic device for counting number of particles. This distribution curve shows that the particles of the fly ash used had a mean of about 12 $\mu$m, 85% of particles were less than 20 $\mu$m, and had as little as possible of dust-like fractions (1 $\mu$m and less). Here are the other properties of that fly ash:

| | |
|---|---|
| Specific density | 1.95 g/cm$^3$ or less; |
| Bulk density | 0.90 g/cm$^3$; |
| Specific surface | 2.5 to 3 m$^2$/g; |
| Weight loss after prolonged heating at 200° C. | <0.5% |

Figure 4:
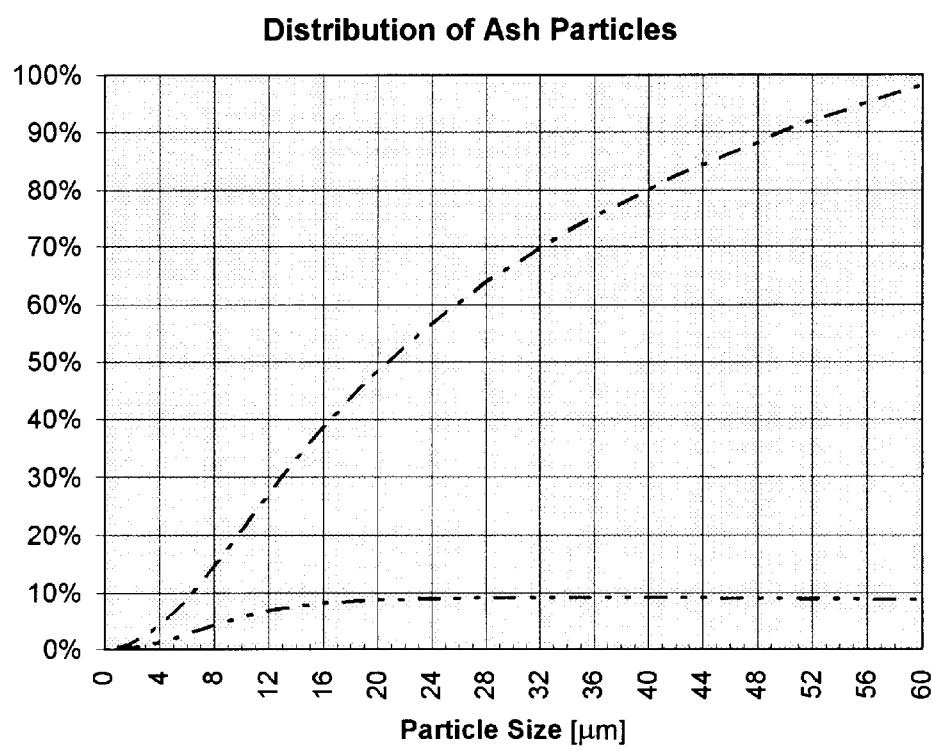
FIG. 4 is a graph showing the distribution of the fly ash particles used when the impact of fibers in a filled composition on the composition's adhesion property to metal was studied; a line-dot-dot-line represents distribution of the fly ash particles, and a line-dot-line represents the cumulative distribution.

Acceptable results were also obtained with fly ashes of different specific gravities (from 1.65 to 2.41 g/cm$^3$), different specific surfaces (up to 3.35 m$^2$/g), and quite different particle size distributions. For illustration, a particle distribution for one of the other ashes used in the reasearch work is presented in FIG. 4.

Calcium carbonate is another filler which is suitable for the composition of this invention. Calcium carbonate is one of the most popular fillers on the market, produced in a wide variety of modifications. Everyone skilled in the art of filling polymers with extender fillers is well familiar with this filler.

Apart from the fly ash and calcium carbonate, nickel powder with an average particle size of 25 μm, sawdust with an average particle size of around 1.5 mm and humidity below 1%, and ceramic fibers (a product of 3M Company, trademark NEXTEL 480) were also tested as fillers.

In order to improve some targeted parameters of compositions, I used various supplementary fillers in conjunction with fly ash and other substantially microspheric extender fillers. For instance, in order to improve the impact strength of a highly fly ash-filled composition, I used the aforementioned ceramic fibers (NEXTEL 480).

In some circumstances, a solid-particle filler can be supplemented by a filler of a quite different nature, such as bitumen, in amount of up to 80 wt. % of the solid-particle filler. In the process of compounding, such supplementary filler is liquefied. In some examples of this invention, I used bitumen with fly ash. This was bitumen of the kind close to the one known as RFS #5349 produced by Witco Corporation's Golden Bear Division. In order to improve the noise insulation-properties of the composition, I used polyurethane foam as a supplementary filler in conjunction with fly ash. The particular polyurethane foam used in Example 4 was recaptured from the waste stream.

Filler Coating Material

In the experiments the inventor used three coating materials: a LLDPE, a polyurethane, and a blend of polyurethane with PVC. LLDPE was used as coating material when the matrix materials were either HDPE or PP. Polyurethane as the coating material was used with PET and PVC. The physical and mechanical characteristics of these coating materials are given in Table 2 below.

The eventual coating layer around a filler particle is formed during thermal processing when the coating material and the matrix material are brought into melting state, e.g., during granulation, extrusion, rotational molding, and the like. However, favorable conditions for formation of a continuous coating layer around filler particles are set up during the hot mixing stage of the composition preparation. More detailed information about mixing of the components is given later in the section in which the preparation of compositions is discussed.

Diffusion Zone

A diffusion zone is the zone in which the coating material and the matrix material are mutually penetrating one another by the process of diffusion. The amounts of mutually diffused coating material and matrix material in the diffusion zone do not exceed the limits of their mutual compatibility in a polymer blend.

The presence of such a diffusion zone, in which the coating material and matrix material are diffused into one another according to the laws of mutual diffusion during the thermal processing stage of the compounding, further dilutes the border between the filler and the matrix material, which further increases the service life of products made from filled compositions of this invention.

As has been confirmed by experiments, for each particular composition and its preparation technology there is a given interval for the thickness of a coating layer around a filler particle which secures the continuity of such a layer.

However, the actual amount of a coating material for a given composition is selected above that which is needed to secure continuous coating layer around the filler particles: by design, the amount of the coating material is selected not only to provide a continuous coating layer, but also to provide the material for the formation of transitional zones around coated filler particles.

Matrix Material

The properties of the continuous matrix materials used in the examples (HDPE, PET, PP, and rigid and flexible PVC), as well as the filler coating materials used in the examples (LLDPE, Polyurethane 1, and a blend of PVC with polyurethane, marked as Polyurethane 2) are given in the Tables 2a and 2b.

TABLE 2a

| Property | LLDPE | Polyur. 1* | Polyur. 2** | HDPE |
|---|---|---|---|---|
| Density | 0.92 g/cm³ | 1.26 g/cm³ | 1.22 g/cm³ | 0.956 g/cm³ |
| Melt flow index (2,18 kg, 190° C.) | 5.7 g/10 min | — | 113 g/10 min | 0.1 g/10 min |
| Tensile strength at yield | 19.3 MPa | 20.6 MPa | 41 MPa | 22.1 MPa |
| Ultimate elongation at yield | 1,000% | — | — | >1,000% |
| Flex modulus | 7,590 MPa | 1,379 MPa | — | 830 MPa |

*Polyurethane 1 is a non-elastic polyurethane, like that which is produced by LNP under the trade name of State-Kont.
**Polyurethane 2 is a PVC/polyurethane blend (alloy), like that which is produced by Alpha Chemical under the trade name of Vythene 27-80.

TABLE 2b

| Property | PET | PP | Rigid PVC | Flex. PVC |
|---|---|---|---|---|
| Density | 1.23 g/cm³ | 0.905 g/cm³ | 1.45 g/cm³ | 1.32 g/cm³ |
| Melt flow index (2,16 kg, 190° C.) | — | 30 (g/10 min) | — | — |
| Tensile strength at yield | 38 MPa | 37 MPa | 42 MPa | 18.6 MPa |
| Ultimate elongation at yield | — | >100% | 90% | 300% |
| Flex modulus | 1,683 MPa | 1,655 MPa | 2,690 MPa | — |

In addition to a polymer plasticizer, a continuous matrix material may also contain a certain amount of the corresponding coating material.

Polymer Plasticizer is in the range of 8,000 to 10,000. The major role of this and another polymer plasticizer used in the experiments of the present invention was to improve the strength to the product made of the composition and at the same time to limit the impairment of the deformation properties of the system.

The atactic polypropylene used in the examples of the invention had the following physical characteristics:

| | |
|---|---|
| Specific weight | 0.83 to 0.87 g/cm³ |
| Vapor pressure | 10 mm of Hg at 350° F. |
| Ring and ball softening point | 230° F. |
| Flash point | >300° F. |
| Fire point | >350° F. |

(Hereinafter an atactic polypropylene of the above properties is referred to as "APP".)

The APP used by the author was a leftover product from the production of polypropylene and had no commercial value. Later, identical results were achieved with a commercially available atactic polypropylene. That APP is sold to the wax and varnish industry by The International Group, Inc., Texas, under the trade name Bymel 200. The cost of Bymel 200 is about equal to that of polyolyfine resins.

Preparation of the Composition of the Invention

Preparation of the invented compositions uses basically the same equipment as is used for processing a rigid PVC.

For the sake of this discussion, the production of the invented compositions can be conditionally discussed as a process consisting of three different mixing stages, at least two of which also have dosing functions. In Stage 1, the required amounts of filler particles and coating material in powder form are fed into an apparatus, and mixed in that apparatus at some elevated temperature which is still below the coating material melting point. The dual purpose of Stage 1 is to homogenize the first mixture and to prepare the filler particles for coating with coating material later.

In Stage 2, a continues matrix material and a polymer plasticizer are added to the first mixture, and the second mixture is prepared. Sometimes, instead of adding the polymer plasticizer in Stage 2, the plasticizer can already be added during Stage 1. When Stage 2 is a part of a cyclic preparation process, the temperature of the mixture is artificially cooled down to about 40° C. When Stage 2 is a part of a continuous compounding process, e.g., in a twin screw compounding-type extruder, Stage 2 is shortly converted into Stage 3 (which is described below). In the latter case, there is no need for cooling the mixture in Stage 2.

Stage 3 is the melting and mixing stage. The temperature during that stage is above melting temperature of matrix material. Stage 3 has two major tasks to perform: to complete the formation of continuous coating layers around the filler particles, and to provide the conditions necessary for completion of the diffusion zones around the coated filler particles.

Here is how a filled composition was prepared in a two-step, hot/cold mixer, and then granulated in a twin screw compounding extruder. The composition consisted of 30 wt. % fly ash filled HDPE/LLPDE (in 90/10 ratio), with APP in the amount of 1.5 wt. % of the filler. A M-2400/K two-step hot/cold mixer was used (300–330 kg/hour capacity, made by MTI, Germany).

Stage 1: 60 kg of fly ash (the filler) and 6 kg of LLDPE (the coating material) in powder form were poured into the hot mixer, and then the hatch was closed. The material was mixed for 15 minutes in the hot mixer, while the temperature of the mixture rose to 90 or 100° C. Stage 2: the hot mixture was transferred into the cold mixer, and a 90 g of APP (the polymer plasticizer), and 54 kg of HDPE (the polymer matrix material) in powder form were added. The cold mixing was conducted until the temperature of the mixed material inside the mixer dropped to 40° C., which took place in 10 to 15 minutes. Stage 3: the mixture of all the ingredients of the composition in its powder form was poured in the hopper of a compounding extruder and pelletized.

About the same results were obtained when, instead of adding the polymer plasticizer in Stage 2, the polymer plasticizer was put directly into the hot mixer (Stage 1). Acceptable results were also obtained when the entire component mixing and thermal treatment procedures were conducted in a twin-screw extruder, such as the ZSE-27 of American Leistritz Extruder Corp.

The best optimal amounts of the filler coating material in the filler coating layer and of polymer plasticizer in the mixture were selected experimentally.

As was expected, the optimal amount of the polymer plasticizer depends on the amount of filler, and on the nature of that filler: the more the particles of a filler differ from microspheres, and the more absorbent the surface of these particles, the higher the optimal relative ratio of the plasticizer to the filler for that particular filler. For instance, for metal powders, and regrinds of used plastics, it was found that the upper level of an APP in the mixture was 10 wt. % per total weight of the filler. For fillers with a high level of absorption for the plasticizer, such as some organic fillers (e.g., sawdust), the upper level of APP/filler can be as high as 0.15.

Basic Assumption

This invention is based on the assumption of the author that filler should be incorporated into the continuous polymer matrix in a way which is most advantageous for intermolecular energy exchange in that composition. Here are some considerations from other sources which seem to support the assumption.

It is known (Nielsen L. E., Mechanical Properties of Polymers, van Norstrand-Reninhold, Princeton, N.J., 1962) that a mechanical action on heterogeneous multiple-component systems may develop in these systems a complicated reaction which depends on the mixture morphology, degree of molecular compatibility, or mutual penetration and dimensions of phases, as well as on molecular relaxation processes in each of the components of the mixture.

As shown by Ohlberg S. M., Raff R. A., Fenstermaker S. S. in *Polymer Science*, 35, pg. 531, 1959, the degree of intermolecular interaction on the surface of polyethylene can be evaluated by measuring variations in the absorption index at the maximum of the 730 cm$^{-1}$ band. That work not only confirms the ongoing energy exchange on the molecular level, but it also presents a way for experimental assessment of the influence of fillers on intermolecular relaxation in polyethylene-based compositions. In other words, there is a way to test whether the presence of an extender filler, such as fly ash, in a composition of the present invention is suppressing intermolecular energy exchange.

Experiments were conducted to assess the intermolecular energy exchange for filled compositions of this invention and compared with the control sample of non-filled HDPE. The results of the experiments showed that the extender filler, as it was incorporated into the composition of this invention, did not suppress the intermolecular energy exchange, while the same amount of the same filler incorporated by the existing art of filling polymers did suppress the energy exchange considerably, and that the aforementioned basic assumption of this invention is plausible.

Here is how the test specimens were made and the experiments conducted.

Films for IR (infrared) spectral measurements were manufactured from a number of HDPE-based compositions of the present invention, from identical compositions in which the fillers were not treated, and from non-filled HDPE (control specimen). The films had a thickness within the range of 40 to 50 $\mu$m compositions in which the fillers were not treated, and from non-filled HDPE (control specimen). The films had a thickness within the range of 40 to 50 $\mu$m and were produced by pressing during 10 min at a temperature of 175° C. and under pressure of 15 MPa. Table 4 shows variations in intermolecular interaction of HDPE in the composition of the invention and in compositions where fly ash was not treated in accordance with the invention, or with no fly ash at all, as assessed by measuring the absorption index at 730 cm$^{-1}$ in a conventional spectrophotometer.

TABLE 3

| Fly Ash in different HDPE-based compositions | | The measured absorption index which corresponds with the level of intermolecular interaction on the surface of each test specimen ($a° \cdot 10^6 \cdot cm^{-1}$) |
|---|---|---|
| 0 wt. % | — | 16.2 |
| 10 wt. % | Untreated[*)] | 13.5 |
| 20 wt. % | Untreated[*)] | 10.1 |
| 30 wt. % | Untreated[*)] | 7.4 |
| 40 wt. % | Untreated[*)] | 6.1 |
| 10 wt. % | Treated in accordance with the invention | 19.2 |
| 20 wt. % | Treated in accordance with the invention | 21.2 |
| 30 wt. % | Treated in accordance with the invention | 21.1 |
| 40 wt. % | Treated in accordance with the invention | 19.1 |

[*)]The word "untreated" means "fly ash not treated in accordance with the invention".

It can be seen from Table 3 that in compositions that contain fly ash which has not been treated in accordance with the invention, the intermolecular interaction of HDPE drops on the phase interface, and that the compositions which contain the fly ash treated in accordance with the invention are characterized by an increase in the HDPE intermolecular interaction at the initial stage, that this characteristic remains unchanged, and later drops insignificantly but remains above the initial level.

Figure 2:
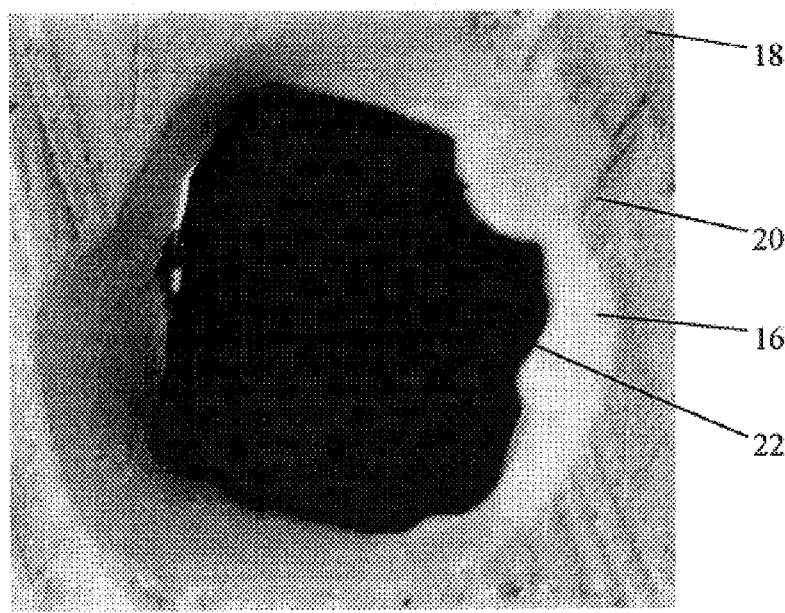
FIG. 2 shows a filler particle within the continuous matrix material of a HDPE-based composition of the current invention as it is seen through an electron microscope.

An electron-microscopic study of a composition of this invention was conducted the same way as it was done for the composition represented in FIG. 1. In order to make these compositions more alike, the base polymer, HDPE, and the fly ash for the compositions presented in FIG. 1 and FIG. 2 were taken from the same batches; even the diameters of both fly ash particles captured in FIG. 1 and FIG. 2 happened to be of about the same outer diameter, about 12 μm. In FIG. 2, a fly ash particle 16, which happened to be substantially cenospheric with a void 22 inside (as most fly ash particles tend to be), is in the continuous polymer matrix material 18. Incidentally, it is quite likely that the filler particle 10 in FIG. 1 was also hollow, however the cut didn't go through the body of the filler particle 10 to reveal whether there was a void inside of the particle.

The essential difference between the compositions of FIG. 1 and FIG. 2 is that FIG. 2 doesn't have a dark "donut" of embryonic microcracks around the filler particle 16 in the border region 20 between the phases. Because the composition of the invention (FIG. 2) is free of embryonic microcracks "ready and willing" to develop into a fatal rupture, the filled composition of this invention is superior to the known compositions in regard of strength, elongation and life expectancy.

Properties of the Invented Compositions

The results obtained by the spectrographic study (see Table 3) and the collaborating illustrations by electro-microscopy (FIG. 1 and FIG. 2) are well in agreement with the physical and mechanical parameters of the compositions of the invention which are shown in Tables 4 and 5. Table 4 relates to a 90/10 blend of HDPPE/LLDPE with fly ash, and Table 5 relates to a 70/30 blend of HDPPE/LLDPE with fly ash.

TABLE 4

| | Fly ash, wt. % | Melt flow rate g/10 min | Density g/cm³ | Elongation at yield % | Modulus of elasticity MPa | Tensile strength at yield MPa |
|---|---|---|---|---|---|---|
| 1 | 10 | 0.1–1.0 | 1.01 | 1,300 | 1,450 | 26.2 |
| 2 | 20 | 0.1–1.0 | 1.05 | 800 | 1,590 | 26.2 |
| 3 | 30 | 0.1–1.0 | 1.12 | 750 | 1,830 | 24.8 |
| 4 | 40 | 0.1–1.0 | 1.19 | 530 | 1,930 | 24.1 |

TABLE 5

| | Fly ash, wt. % | Melt flow rate g/10 min | Density g/cm³ | Elongation at yield % | Modulus of elasticity MPa | Tensile strength at yield MPa |
|---|---|---|---|---|---|---|
| 1 | 10 | — | 1.01 | 820 | 1,930 | 23.4 |
| 2 | 20 | — | 1.05 | 750 | 2,410 | 26.9 |
| 3 | 30 | — | 1.12 | 650 | 2,900 | 27.6 |
| 4 | 40 | — | 1.19 | 400 | 2,900 | 28.3 |

Some additional properties of the 30 wt. % fly ash-filled HDPE/LLDPE (in 90/10 ratio) are given in Table 6.

TABLE 6

| | Property | Typical Value |
|---|---|---|
| 1 | ESCR, $F_{50}$ | >200 hr |
| 2 | Hardness | 62 Shore D |
| 3 | Charpy Impact Strength | No failure |
| 4 | Creep modules, $E_0$ | 1,100 MPa |
| 5 | Brittleness temperature | <−60° C. |
| 6 | Linear thermal expansion (Average value for temperature range from 20° C. to 90° C.) | $5 \times 10^{-5}$/° C. |
| 7 | Thermal conductivity (at 20° C.) | 0.31 w/m ° C. |
| 8 | Specific heat | 1.79 cal/kg ° C. |
| 9 | Crystalline melting range | 126–130° C. |
| 10 | Thermal stability induction time | 15 min at 210° C. |
| 11 | Vicat softening temperature | 126° C. |

When I compare the physical and mechanical properties of the HDPE-based compositions of the invention (given in Tables 4 and 5) with the corresponding properties of HDPE (and LLDPE) used in the compositions (see Table 2), we see that HDPE-based, 10 to 40 wt. % fly ash-filled compositions of this invention have higher tensile strength and higher modulus of elasticity than the pure HDPE has.

When we compare the data in Tables 4 and 5 with the data about known filled HDPE compositions given in Table 1, we see that all the HDPE-based filled compositions of the invention have at least an order higher elongation at yield, and in some cases even more than that, and higher values of tensile strength at yield and flex modulus. Thus, the HDPE-based compositions of the present invention are superior to similar compositions produced by the known art of filled compositions, including the composition described in the aforementioned USSR Inventor's Certificate Application, and the compositions of Washington Penn and RTP.

In order to test the efficiency of the invention, compositions with properties shown in Tables 4 and 5 were used for manufacturing pipes. For more about these pipes see Example 1.

In order to assess the chemical stability of the invented composition, test specimens of 30 wt. % fly ash filled HDPE/LLDPE (70/30 weight ratio), and test specimens of non-filled HDPE were prepared the same way as the specimens for IR spectral testing (40 to 50 μm thick specimen were produced by press-molding during 10 min at a temperature of 175° C. and under pressure of 15 MPa). The specimens were held for 1, 3 and 5 months in a 10% water solution of NaCO₃. Table 7 shows how much weight the specimens lost as a result.

TABLE 7

| Length of Exposure to NaCO₃ Solution | Loss of Weight (wt. %) | |
|---|---|---|
| | HDPE | 30 wt % fly ash HDPE/LLDPE ratio 70/30 |
| 1 month | 0.56 | 0.40 |
| 3 months | 0.58 | 0.42 |
| 5 months | 4.01 | 2.80 |

There was also a more elaborate comparison of the chemical resistances. Pieces of the 30 wt. % fly ash-filled 70/30 HDPE/LLDPE specimens were submerged in twelve different media at room (25° C.) and at warm (45° C.) temperatures and their respective weight stabilities assessed. Then the same was done with specimens made from HDPE, and the results of these two sets of tests were compared.

Here are the media into which the test pieces were submerged:

(a) Mild solutions of mineral acids, (b) Solutions of mineral acids of medium concentration, (c) Solutions of mineral acids of high concentration, (d) Solutions of diluted organic acids, (e) Organic acids insoluble in water, (f) Solutions of mineral salts, (g) Alkali solutions, (h) Solutions of oxidants, (i) Mineral oils, (j) Aliphatic solvents (k) Aromatic solvents, (l) Halogen-containing aliphatic solvents.

The assessments were based on the resistance of HDPE to mild solutions of mineral acids at normal temperature on a five-grade scale where "5" was assigned to the HDPE having the highest resistance. If a given material in a given environment and temperature lost the same or smaller percentage of its original weight as did HDPE in mild solutions of mineral acids at normal temperatures, "5" was assigned to that material in the given conditions. "4" was assigned to a satisfactory resistance of a coating material. "3" meant that the resistance was not always satisfactory. "2" and "1" indicated that the resistance of a coating material was unsatisfactory and, therefore, the material was not recommended for those particular conditions.

The outcome of these assessment tests for a 30 wt. % fly ash-filled, 70/30 HDPE/LLDPE-based compositions is given in Table 8. The assessment of the resistance of each specimen at room temperature is listed first, and then after the slash the same is listed for the hot temperature.

TABLE 8

| Material of Pipe | Assessments of Materials in Given Environments | | | | | | | | | | | |
|---|---|---|---|---|---|---|---|---|---|---|---|---|
| | (a) | (b) | (c) | (d) | (e) | (f) | (g) | (h) | (i) | (j) | (k) | (l) |
| HDPE | 5/5 | 5/5 | 5/3 | 5/4 | 3/2 | 5/5 | 5/5 | 4/2 | 4/2 | 3/2 | 1/1 | 1/1 |
| 30 wt. % ash-filled, HDPE/LLDPE ratio 70/30 | 5/5 | 5/5 | 5/4 | 5/5 | 4/4 | 5/5 | 5/5 | 4/3 | 4/4 | 4/4 | 2/3 | 2/3 |

In the media marked (k) and (l), the 30 wt. % ash-filled, 70/30 wt. ratio HDPE/LLDPE composition behaved even better at hot temperatures than it did at room temperatures.

In order to assess the resistance of the invented compositions to thermooxidation, test specimens of 30 wt. % fly ash filled HDPE/LLDPE (70/30 weight ratio), and test specimens of pure HDPE were prepared and tested for the length of their corresponding inductive periods of oxidation. The test specimens were prepared the same way as the specimens for IR spectral testing (40 to 50 μm thick specimen, produced by pressing during 10 min at a temperature of 175° C. and under pressure of 15 MPa). The test specimens were introduced into a device for testing polymer oxidation (see N. Grassie and N. A. Weir, *Journal of Applied Polymer Science*, 9, 1965, pg. 963). When the specimens were immersed into an oxygen-rich environment of the device at high temperature, the polymer started to absorb oxygen. The experiments were conducted at 200 mm Hg pressure and 140° C. Absorption of oxygen by polymers starts after some initial period of time; that period of time is called the "induction period". The induction period for the invented composition was 160 minutes, whereas the induction period for the control specimen made from pure HDPE was 105 minutes. The experiment is reflected in Table 9:

TABLE 9

| Pipe Material | Induction Period (Tested at 200 mm Hg pressure and 140° C.) |
|---|---|
| HDPE | 105 min. |
| 30 wt. % ash-filled HDPE/LLDPE ratio 70/30 | 160 min |

The thermooxidation tests showed that under the conditions specified in Table 9 the invented composition has about 50% higher resistance to thermal oxidation than HDPE.

The surface profile or surface roughness of film made from a 64 wt. % fly-ash-filled HDPE of the invention was measured in the Surface Laboratory of the University of Western Ontario in London, Ontario, Canada, and uncovered a remarkable thing: the spectrogram made with X-Ray Photoelectron Spectroscopy showed that the surface unevenness of my highly fly ash-filled film was only about 50 Å. (That method for measuring the roughness of surfaces was developed by the University's Science Center.)

In order to properly comprehend the meaning of the 50 Å as a measure of surface roughness for my polymer film, that figure should be compared with the surface roughnesses obtainable when using other polymer compositions. As it is stated in *Polymer Blends*, edited by D. R. Paul and S. Newman, Volume 2, pp. 447–428, the surface unevenness for the polymers which have the smallest shrinkages [and therefore are expected to produce the smoothest surfaces] is not less than 1 μm. Thus, the surface profile of a 64 wt. % fly ash-filled HDPE/LLDPE film had a surface quality about 10,000 times better than the same for the low-shrinkage polymers discussed in the aforementioned book.

Filled compositions of this invention, from which very smooth surfaces can be formed, could provide a highly effective contact between the invented composition and a substrate. Having that in mind, the strength of adhesion of invented filled compositions to a common grade steel was evaluated by simple means described below.

Standard 0.5"×0.25" square, general purpose rods of mild steel were purchased from a hardware store and cut into about 4 cm long pieces. There was no special treatment of these metal pieces in preparation for the bonding. Pairs of such pieces were pressed together in a sandwich, the top metal piece placed crosswise over the lower metal piece, and a piece of my filled polymer material between them. The piece of my polymer material between each pair of metal rods was about 12 mm wide, 12 mm long and about 2.5 mm thick (initially). The two metal surfaces, with a piece of my filled polymer between them, were bonded together by heating up the metal rods until the polymer between them started to melt, at the same time maintaining the pressure gripping together the two metal rods. Four seconds after the polymer started to run, the still gripped together sandwich was cooled down in a water bath, and left to "age" for 24 hours. Then the bonded pieces of metal were pulled apart perpendicular to the surface of bonding. The force at which the bond came apart, divided by the surface of the bond, gave us the strength at rupture of the bond per surface unit. By dividing that bond strength at rupture by the averaged bond strength at rupture of the same but unfilled HDPE I get a coefficient of relative adhesion k for given level of loading, defined as $k=\sigma_F/\sigma_0$, where $\sigma_0$ is the maximum bonding strength (load/surface area) at rupture of non-filled HDPE, and $\sigma_F$ is the maximum bonding strength at rupture of a filled composition of this invention for a given level of loading.

Table 10 shows the results of the tests.

TABLE 10

| HDPE/LLDPE (70/30 ratio), filled with fly ash (wt. %) | Coefficient of relative adhesion "k" |
|---|---|
| 30 | 2.1 |
| 40 | 6.3 |
| 50 | 10.2 |

Thus, the invented compositions have improved adhesion with metals.

In addition, these compositions also have high adhesive properties with dielectric materials, such as glass, and even with porous materials, such as wood. I discovered the latter quite by chance when using blocks of wood as insulators while bonding a sheet material made of my filled composition to a piece of steel rebar.

Standard cathodic disbonding tests were conducted on a 40 wt. % fly ash filled HDPE/LLDPE 70/30 composition and on an identical composition which had 5 wt. % fibers added to it to boost the composition's impact resistance property. The fibers used were NEXTEL 480 made by 3M Company. The fly ash used in these compositions had the particle size distribution shown in FIG. 4. The technology used for compounding compositions, making test specimens and testing was that traditionally used in the anticorrosion coating industry. The tests showed that the presence of ceramic fibers in a composition did not reduce the adhesion of that composition to metal, or increase its cathodic disbonding.

Here is still another interesting rheology-related aspect of the invented compositions. When extruding 32 mm×2 mm pipes on a S1.30.25 twin screw extruder from a non-filled HDPE and from various fly ash-filled HDPE/LLDPE 70/30 compositions of this invention, the following observations were recorded:

TABLE 11

| Materials Extruded Into 32 mm × 2 mm Pipe | "T" Torque (energy) kg·m | "p" Productivity m/min | "p" Productivity kg/min | "r" Relative Increase in Energy Efficiency |
|---|---|---|---|---|
| 1 Non-filled HDPE (control) | 140 | 0.4 | 6.1 | |
| 2 20 wt. % fly ash-filled HDPE/LLDPE 70/30 | 210 | 1.1 | 15.0 | 83% |
| 3 25 wt. % fly ash-filled HDPE/LLDPE 70/30 | 195 | 1.2 | 18.1 | 115% |
| 4 30 wt. % fly ash-filled HDPE/LLDPE 70/30 | 205 | 1.0 | 15.3 | 71% |

(The temperatures for various zones of extrusion are given in Example 1.)

The torque for extruding each raw material (for non-filled HDPE and for each of the three filled compositions used) into a given pipe was the highest with which an acceptable-quality end product could be produced from the corresponding material on that extruder.

The last column in Table 11 gives the computed values for the increase in energy efficiency "$r_i$" [%] for production of a given pipe on the same extruder from a given composition relative to the non-filled composition. This value is computed as follows:

$$r_i = T_{HDPE} \cdot p_i / (T_i \cdot p_{HDPE}) - 1$$

and is given in percents, where $T_{HDPE}$—the torque [kg·m] for the non-filled HDPE, $p_{HDPE}$—the productivity [m of pipe/min] with the non-filled HDPE $T_i$—the torque [kg·m] for a given filled composition, and $p_i$—the productivity [m of pipe/min] with the given filled composition.

From Table 11 we can see that, at least for these filled compositions of this invention, both the energy efficiency of extrusion and the productivity are better than for the non-filled HDPE. The torque for extruding the given pipe from the filled compositions (from 195 to 210 kg·m) and the corresponding productivities (from 1.0 to 1.2 m/min) are considerably higher than the torque (140 kg·m) and the corresponding productivity (0.4 m/min) with which the given pipe could be extruded from the non-filled HDPE. Energy-wise, too, the filled compositions were performing from 71 to 115% better.

Here is another interesting aspect revealed in Table 11: the torque and the productivity are not in linear relations with the level of filling; within the region of the given levels of filling, the relationships have at least local optimum(s). The extrusion process of the 25 wt. % fly ash-filled composition (line 3 in Table 11) requires less energy than the extrusion of 20 wt. % and 30 wt. % compositions (lines 2 and 4, respectively, in Table 11). In comparison with the composition of line 2, the composition of line 3 has an 8% lower torque and a 10% higher productivity (measured in meters of the same-dimension pipe produced per minute); and in comparison with the composition of line 4, the composition of line 3 has about 5% lower torque and a 20% higher productivity.

Thus, the composition of line 3 of aforementioned Table 11 consumes less energy during extrusion. Most likely, this is associated with the structure of the composition of line 3 in Table 11 and, in particular, with a low viscosity of the composition regarding the shear deformation in its molten state. It can be assumed that on the microscopic level, the coating LLDPE layer which exists around the filler particle independently rotates around the filler particle or rotates together with it. This particular phenomenon can explain a decrease in the torque of the extruder in the course of the processing of the composition.

Table 11 provides another proof of the uniqueness of the invented compositions.

The present invention will be further described with reference to practical examples; but the examples should not limit the scope of the invention or Claims.

All parts and percentages in Examples are by weight.

EXAMPLE 1

Pipes (outside diameter [OD]=32 mm, wall thickness [h]=2 mm) were extruded from 10 wt. % fly ash-filled, HDPE/LLDPE (in 90/10 ratio) composition, and from 30 wt. % fly ash-filled HDPE/LLDPE (in 70/30 ratio). The physical and mechanical properties of these compositions are given in Table 5, line 2, and in Table 6, line 4, respectively.

The pipes were extruded on an S1.30.25 twin screw extruder. The temperatures in various zones of extrusion were as follows:

| Cylinder | 180° C., | 185° C., | 190° C., | 195° C. |
|---|---|---|---|---|
| Head | 200° C. | | | |
| Die | 205° C. | | | |
| Melt Temp. | 200–210° C. | | | |

The pipes had excellent surface. These pipes were subjected to various tests.

The durability of the pipes was tested according to ASTM 4279. Table 12 contains the results of the durability testing of the pipes.

TABLE 12

| | | Time before failure (in hours) | | |
|---|---|---|---|---|
| No | Composition of Pipe | 15 MPa, T = 20° C. t ≧ 1 hr | 4.2 MPa, T = 80° C. t ≧ 44 hr | 3 MPa, T = 80° C. t ≧ 170 hr |
| 1 | HDPE | 12.5 | satisfied | satisfied |
| 2 | 10 wt. % fly ash, HDPE/LLDPE ratio 90/10 | 7 | 112 | 245 |
| 3 | 30 wt. % fly ash, HDPE/LLDPE ratio 70/30 | 2.5 | 125 | 420 |

The requirements for passing the tests are given in the upper right part of the table, i.e., a pressure pipe should not fail when tested under 15 MPa at 20° C. for one hour. An interesting aspect revealed by the tests was that the higher the level of filling with fly ash, the better the pipe performs at higher temperatures: at 80° C., the 30 wt. % filled pipe failed after 420 hours, whereas the 10 wt. % filled pipe failed after 245 hours.

Thus, as can be seen from the test results, pipes made from at least up to 30 wt. % fly ash-filled, HDPE-based compositions of the present invention satisfy requirements of pipes for high-pressure water-supply pipelines. Furthermore, these pipes could successfully withstand the work at temperatures of about 80° C.

The strength of weld of these pipes was at least 90% of the tensile strength at yield of the material, i.e., 23 MPa for 10 wt. % ash-filled, HDPE/LLDPE 90/10 pipe, and 27 MPa for 30 wt. % ash-filled, HDPE/LLDPE 70/30 pipe.

EXAMPLE 2

Sleeve-type Solar Collectors were blow extruded from the following composition:

| | |
|---|---|
| HDPE | 70 parts |
| LLDPE | 30 parts |
| Fly ash | 66 parts |
| APP | 0.7 parts |

A 500 mm diameter and 300 μm wall thickness sleeve was produced on a blow extruder. The sleeve had the following properties:

| | |
|---|---|
| Melt flow rate (5 kg, 190° C.) | 0.35 g/10 min. |
| Ultimate elongation in the direction of extrusion | $\epsilon_1$ = 400% |
| Ultimate elongation in the direction perpendicular to extrusion | $\epsilon_2$ = 500% |
| Tensile strength at yield in the direction of extrusion | $\sigma_1$ = 20.7 MPa |
| Tensile strength at yield in the direction perpendicular to extrusion | $\sigma_1$ = 15.6 MPa |
| Strength of punctutation | $\sigma_1$ = 34.0 MPa |
| Coefficient of thermal conductivity of the sheet | k = 0.002 cal cm/(° C. cm sec) |

The sleeve was cut into meter-long pieces. Each piece was thermo-welded in such a way that it formed a flexible, waterbed-mattress-like solar collector, having 12 passages for heated water, an incoming manifold, and an outgoing manifold. These solar collectors were tested for three years in a region which had monthly average solar radiation of approximately 36 MJ/m². On an average sunny day around 69° E and 42° N, this less than 0.7 m² solar collector, when in horizontal position and uncovered, heated 45 liters of water from 20° C. to 45° C. hourly.

EXAMPLE 3

A Conductor was extruded from the following composition:

| | |
|---|---|
| HDPE | 70 parts |
| LLDPE | 30 parts |
| Ni powder (25 μm average particle size) | 147 parts |
| APP | 3 parts |

A 300 mm wide and 500 μm thick sheet was extruded and tested with the following results:

| | |
|---|---|
| Density | ρ = 1.7 g/cm³ |
| Ultimate elongation at yield | ε = 200% |
| Tensile strength at yield | σ = 18 MPa |
| Coefficient of thermal conductivity | k = 0.005 cal cm/(° C. cm sec) |
| Coefficient of electrical volume resistivity | r = 2 × 10³ Ω cm |

This composition proved to be suitable for products which should not collect static electricity, such as conveyor belts and various ventilation pipes in mines and chemical plants, and radiators for automobiles.

EXAMPLE 4

A Noise Insulator was extruded from the following composition:

| | |
|---|---|
| HPDE | 70 parts |
| LLDPE | 30 parts |
| Fly ash | 20 parts |
| APP | 0.2 parts |
| Polyurethane foam (recaptured from waste stream) | 80 parts |

A 300 mm wide and 500 µm thick sheet was extruded and tested. Its dielectric conductivity was 1.9, and the tangent of dielectric losses $tg10^6$ was 0.018, and $tg10^3$ was 0.03.

EXAMPLE 5

Pipes for Embedding into Concrete were extruded from the following composition:

| | |
|---|---|
| HDPE | 10 parts |
| LLDPE | 10 parts |
| HPDE (recaptured from waste stream as milk and water bottles and recycled) | 50 parts |
| LLDPE (recaptured from Waste stream as bags and recycled) | 30 parts |
| Fly ash | 80 parts |
| APP | 1.2 parts |

The composition was extruded into 50 mm×4 mm pipe. The pipe was tested for its maximum deformation under a load of 1,000 N acting perpendicular to its wall; the surface of contact was 25 cm². That load caused less than a 10% change in diameter. Such a pipe proved to be suitable for embedding into concrete.

EXAMPLE 6

Irrigation Hoses were extruded from the same composition as in Example 2 (Solar Collectors). Two different sizes of hoses were extruded:

OD=100 mm, wall thickness=200 µm, and

OD=300 mm, wall thickness=300 µm.

These hoses were tested for durability using standard procedures; expected life of these hoses was found to be at least 5 years.

EXAMPLE 7

The following composition was prepared for cast molding Pencils:

| | |
|---|---|
| PP | 61 parts |
| LLDPE | 7 parts |
| Sawdust | 18 parts |
| CaCO$_2$ | 7 parts |
| APP | 7 parts |

Then the standard test specimens (double paddle) were cast molded and tested. The melt index (2.16 kg, 190° C.) was 13 g/10 min. Such pencils were easier to sharpen than wooden pencils, and could be sharpened either with a pocket knife or with all standard pencil sharpening devices.

EXAMPLE 8

A Soil Cover Film for Mulching was made from the following composition:

| | |
|---|---|
| HDPE (recycled) | 38 parts |
| LLDPE (recycled) | 17 parts |
| Bitumen | 20 parts |
| Fly Ash | 25 parts |
| APP | 5 parts |

A 100 µm film was extruded from this composition. The film demonstrated good mulching properties (i.e., protection of soil from loss of heat and moisture).

EXAMPLE 9

The following composition for Rotational Molding was prepared:

| | |
|---|---|
| PVC | 70 parts |
| PVC/Polyurethane | 14 parts |
| Bitumen | 5 parts |
| Fly ash | 10 parts |
| APP | 1 part |

Standard test specimens were cast molded and tested with the following results:

| | |
|---|---|
| Ultimate elongation at yield | $\epsilon = 40\%$ |
| Tensile strength at yield | $\sigma = 19$ MPa |

The above composition appeared to be suitable for rotational molding of large chemical containers and tanks.

EXAMPLE 10

Sheets were coextruded from filled polyolefins where at least one layer contained recycled plastics.

The following two compositions were prepared for a three-layer coextruded sheet A-B-A. Composition A consisted of fresh HDPE and fresh LDPE:

| | |
|---|---|
| HDPE | 70 parts |
| LLDPE | 30 parts |
| Composition B: | |
| Recycled HDPE | 35 parts |
| Recycled LDPE | 15 parts |
| Fly ash | 49.2 parts |
| APP | 0.8 parts |

A 1.5 mm thick and 1,500 mm wide sheet was coextruded from these two compositions. Two outside layers of the sheet were coextruded from composition A, and the middle layer from composition B. The outside and inside layers were both 50 µm thick, the middle layer was 1.4 mm thick. This sheet showed excellent properties for outdoor application.

EXAMPLE 11

Sheets were coextruded from filled PET where at least one layer contained recycled plastics.

The outside layers were the same as in Example 10, but a different composition B was used for the middle layer. Recycled PET and polyurethane were used instead of HDPE/LDPE, and the proportions of the composition were different:

| | |
|---|---|
| Recycled PET | 72 parts. |
| Polyurethane | 8 parts. |
| Fly ash | 20 parts. |
| APP | 1.5 parts |

Then, as in Example 10, a 1.5 mm thick and 1,500 mm wide sheet was coextruded from these two compositions. Two outside layers of the sheet were coextruded from composition A, and the middle layer from composition B. The outside and inside layers were both 50 μm thick, the middle layer was 1.4 mm thick. This sheet also had excellent weather-proof properties.

EXAMPLE 12

The following composition was prepared for Antistatic Insulation Layers of wires and cables:

| | |
|---|---|
| HDPE | 90 parts |
| LLDPE | 10 parts |
| Carbon black | 60 parts |
| Fly ash | 30 parts |
| APP | 10 parts |

Using a laboratory Brabender extruder with a centering crosshead extrusion die, the composition was extruded to insulate copper wire having a 1 mm$^2$ cross-section; the insulation was about 300 μm thick. The degree of decrease in the surface electrostatic charge was twice higher than in a conventional HDPE insulation. The insulation displayed good adhesion to the wire and good weather-proof properties.

EXAMPLE 13

Different composition were prepared for Synthetic Paper. Two of the compositions were:

| | |
|---|---|
| PVC | 105 parts |
| Polyurethane | 12 parts |
| CaCo$_3$ | 50 parts |
| APP | 3 parts, and |
| HDPE | 105 parts |
| LLPDE | 12 parts |
| CaCo$_3$ | 50 parts |
| APP | 3 parts |

Narrow strips were extruded from the above compositions with a Brabender extruder. Both of these strips demonstrated excellent adhesion to inks and dyes; no molecular reorientation (which is usually done by stretching) was needed.

The same results were obtained when, instead of calcium carbonate, the same weight of fly ash was added into the composition:

| | |
|---|---|
| Flex. PVC | 105 parts |
| PVC/Polyurethane | 12 parts |
| Fly ash | 50 parts |
| APP | 3 parts, and |
| HDPE | 105 parts |
| LLPDE | 12 parts |
| Fly ash. | 50 parts |
| APP | 3 parts |

The strips extruded from the latter pair of compositions also demonstrated excellent adhesion to inks and dyes, and their mutual weld was of the same high quality.

EXAMPLE 14

The following Anticorrosion Coating Composition for Metal Pipes was prepared:

| | |
|---|---|
| HDPE | 90 parts |
| LLDPE | 10 parts |
| Fly ash | 42.2 parts |
| APP | 0.42 parts |

The composition was used for anti-corrosion coating of 100 mm metal pipes. The composition was loaded into a hopper of plasma deposition equipment and deposited as a 250 μm to 300 μm thick coating. During the plasma-deposition, the surface temperature of the pipes was kept over 150° C.

The equipment used for plasma deposition was that widely used in the anticorrosive pipe-coating industry.

Thus, it has been shown that the invention provides a highly filled polymer composition which is inexpensive to manufacture, combines high deformation capacity with sufficient tensile strength, has significantly reduced shrinkage and coefficient of thermal expansion, improved chemical and UV resistance, and reduced permeability to oxygen and other corrosive substances, has highly filled polymer compositions which have highly improved adhesion with other materials, such as metals, and can withstand occasional surface impact, so that these compositions can be used as single-layer anticorrosive coatings in the manufacture of metal pipes and similar articles.

Although the invention has been shown and described with reference to specific examples of components of the composition, used in specific proportions and with specific properties, it is understood that the invention is not limited to the examples given but is determined by the attached claims. Any modifications and changes which do not depart from these claims are possible. For example, in the examples the tested articles were produced in the form of extruded pipes, sheets, and films. They, however, can be produced in any other form and configuration, such as disks, profiled articles, etc. The articles can be produced by methods other than those mentioned in the present application, e.g., by injection molding, etc. Filler other than fly ash, calcium carbonate, Ni powder, sawdust, and ceramic fibers, such as diatomaceous earth, and various polymer and glass fibers can be used. The matrix material may be not only in the form of HDPE, rigid or flexible PVC, PET and PP. The coating material other than LLDPE and polyurethane may be used, provided that a given coating material is conditionally compatible with the given continuous matrix material.

What is claimed is:

1. A highly filled polymer composition with improved properties comprising:
   a continuous matrix material;
   a filler material in an amount of 10 to 80 wt. % of said composition;
   a polymer plasticizer dispersed in said continuous matrix material in an amount of 0.5 to 15 wt. % of said filler;
   a filler coating material which coats said filler particles in the form of a continuous coating layer thus forming coated filler particles;
   a diffusion zone around said coated filler particles where said filler coating and said continuous matrix material are mutually diffused into one another wherein said filler coating material is distributed with concentration decreasing in the direction outward from said continuous coating layer;
   said filler coating material being selected from the group consisting of a linear low-density polyethylene and polyurethane.

2. The composition of claim 1, wherein said continuous matrix material is a thermoplast.

3. The composition of claim 2, wherein said thermoplast is a material selected from the group consisting of high-density polyethylene, polyethylene terephthalate, polyvinyl chloride, and polypropylene.

4. The composition of claim 3, wherein said filler is selected from the group consisting of fly ash, calcium carbonate, sawdust, ceramic fibers, and nickel powder.

5. The composition of claim 4, wherein said polymer plasticizer is an atactic polypropylene having a molecular weight within the range of 5,000 to 10,000.

6. The composition of claim 1, wherein said continuous matrix material is a thermoplast selected from the group consisting of high-density polyethylene, polyethylene terephalate, polyvinyl chloride, and polypropylene, said filler is a material selected from the group consisting of fly ash, calcium carbonate, sawdust, ceramic fibers, and nickel powder, said polymer plasticizer is an atactic polypropylene having a molecular weight of 5,000 to 10,000, and said filler coating material is selected from the group consisting of a linear-density polyethylene and polyurethane.

7. The composition of claim 1, wherein said filler material comprises fly-ash particles of a substantially cenospherical configuration.

8. The composition of claim 1, wherein said diffusion zone is located between said continuous coating layer and said continuous matrix material.

9. A method of preparing a highly filled polymer composition with improved properties comprising the steps of:
   providing a filler material in the form of particulate elements;
   coating said particulate elements of said filler with a filler coating material by mixing said filler material in a first mixing stage with said filler coating material at a first temperature which is lower than the melting point of said filler coating material thus obtaining a first homogeneous mixture which contains coated particulate elements in said filler coating material;
   mixing said first homogenous mixture at a second mixing stage with a continuous matrix material of a thermoplast and a polymer plasticizer dispersed in said continuous matrix material at a second temperature which is lower than said first temperature thus preparing second homogenous mixture; and
   forming a highly filled polymer composition in a third stage by further mixing said second homogeneous mixture at a third mixing temperature which is higher than the melting point of said continuous matrix material.

10. The method of claim 9, wherein said filler material is used in an amount of 10 to 80 wt. % of said highly filled polymer composition; said polymer plasticizer dispersed in said continuous matrix material is used in an amount of 0.5 to 15 wt. % of said filler, said filler coating material coats said filler particles after said third mixing stage in the form of a continuous coating layer thus forming coated filler particles, and a diffusion zone is formed in said third mixing stage around said coated filler particles where said filler coating material and said continuous matrix material are mutually diffused into one another and wherein said filler coating material is distributed with concentration decreasing in the direction outward from said continuous coating layer.

11. The method of claim 10, wherein said thermoplast is a material selected from the group consisting of high-density polyethylene, polyethylene terephthalate, polyvinyl chloride, and polypropylene.

12. The method of claim 11, wherein said filler is selected from the group consisting of fly ash, calcium carbonate, sawdust, ceramic fibers, and nickel powder.

13. The method of claim 12, wherein said polymer plasticizer is an atactic polypropylene having a molecular weight within the range of 5,000 to 10,000.

14. The method of claim 13, wherein said filler coating material is a material selected from the group consisting of a linear low-density polyethylene and polyurethane.

15. The method of claim 9 wherein said third mixing stage is a process selected from the group consisting of extrusion, injection molding, rotational molding, and pressing.

16. The method of claim 15 wherein said third mixing stage is a process selected from the group consisting of extrusion, injection molding, rotational molding, and pressing.

* * * * *